Jan. 1, 1935.  C. A. GUSTAFSON  1,986,146
LAND VEHICLE
Original Filed May 2, 1930  9 Sheets-Sheet 2

INVENTOR
CARL A. GUSTAFSON
By Varel, Varel Moore
ATTORNEYS

Jan. 1, 1935. C. A. GUSTAFSON 1,986,146
LAND VEHICLE
Original Filed May 2, 1930 9 Sheets-Sheet 5

INVENTOR
CARL A. GUSTAFSON
By
ATTORNEYS

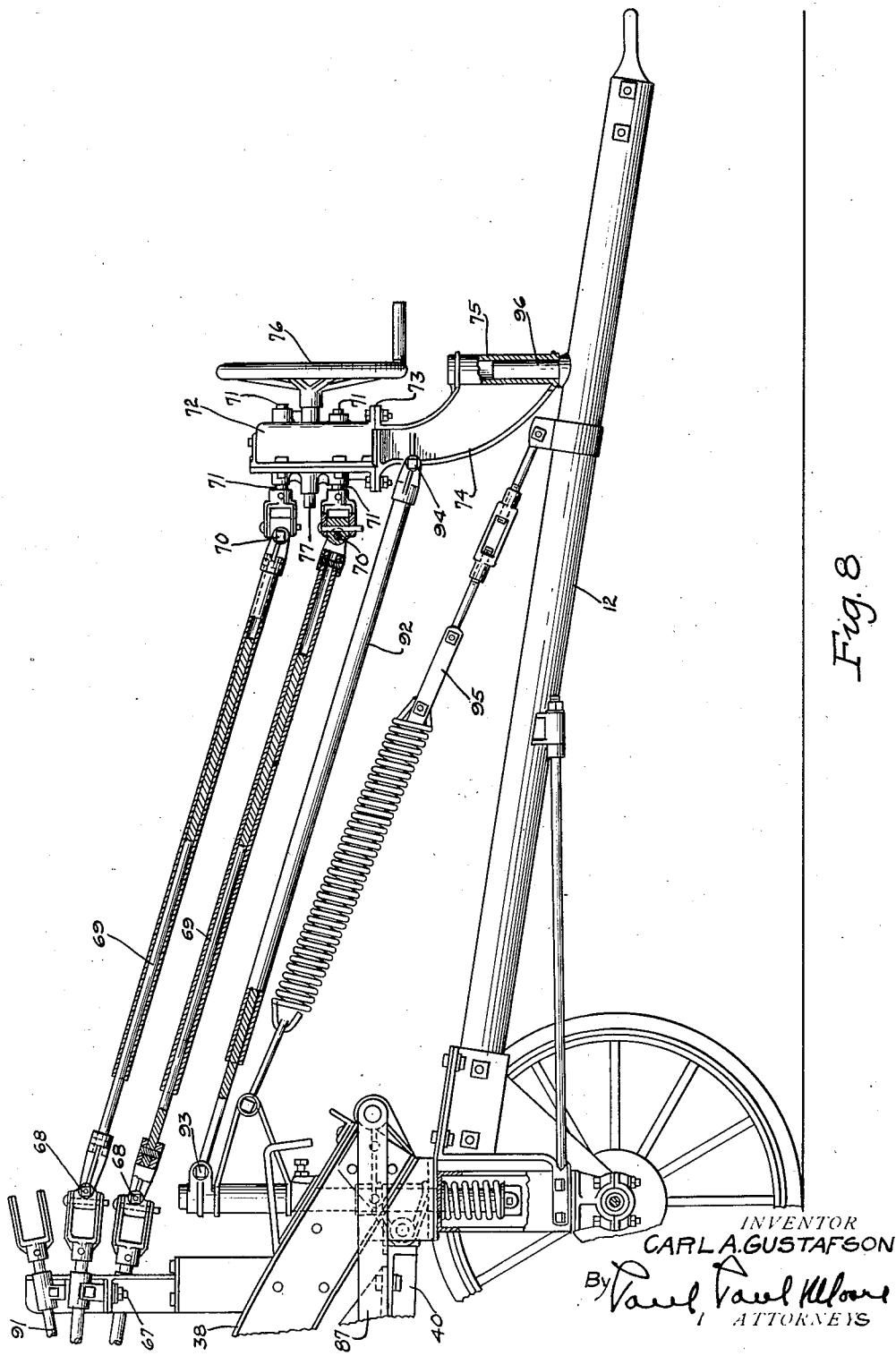

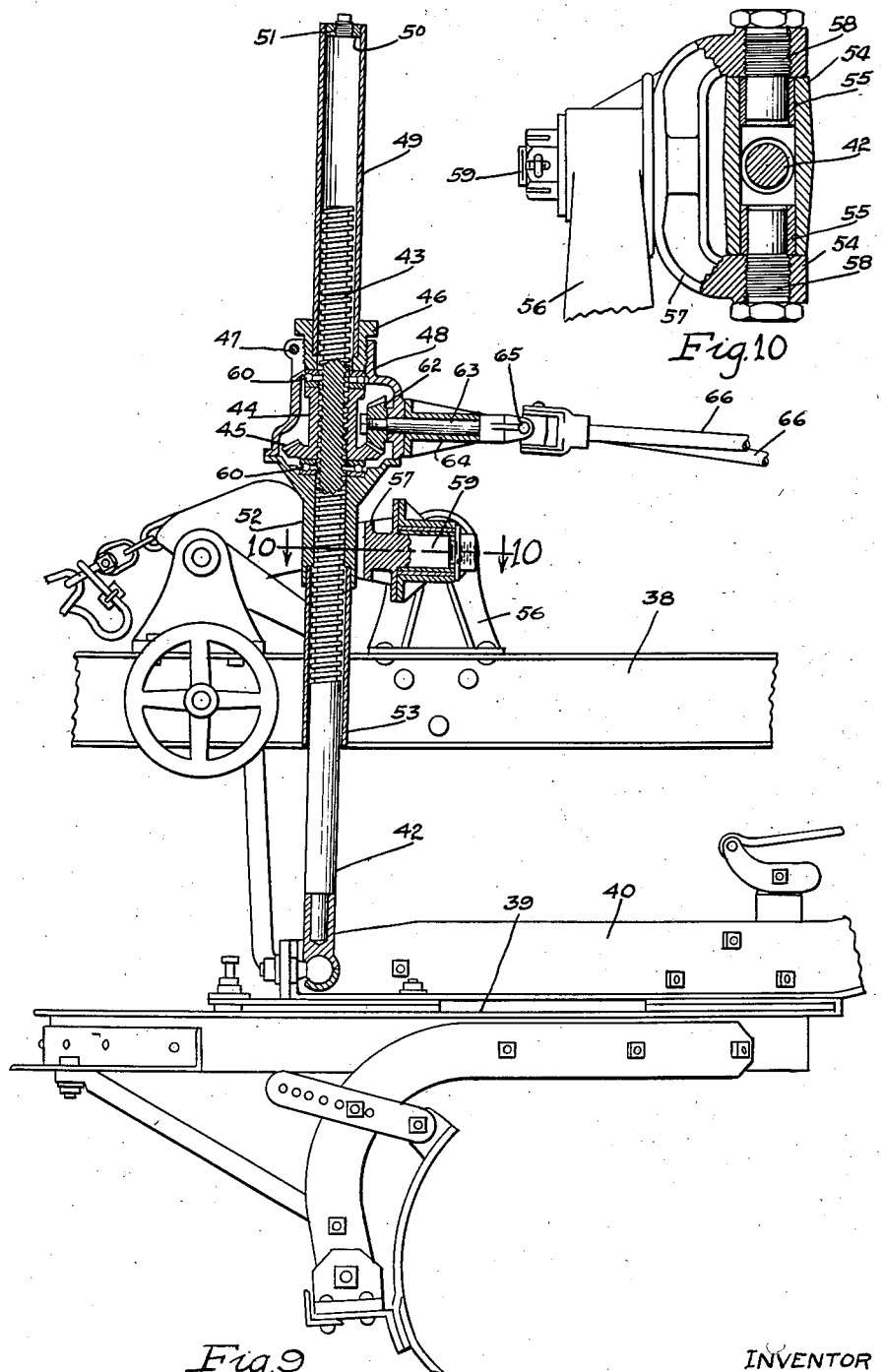

Jan. 1, 1935.  C. A. GUSTAFSON  1,986,146
LAND VEHICLE
Original Filed May 2, 1930  9 Sheets-Sheet 9

INVENTOR
CARL A. GUSTAFSON
BY
ATTORNEYS

Patented Jan. 1, 1935

1,986,146

UNITED STATES PATENT OFFICE 1,986,146

LAND VEHICLE

Carl A. Gustafson, Peoria, Ill., assignor to Caterpillar Tractor Co., Minneapolis, Minn., a corporation of California Application May 2, 1930, Serial No. 449,206
Renewed June 7, 1933

17 Claims. (Cl. 37—153)

This invention relates to improvements in land vehicles adapted to be connected together for operation as a train such, for example, as a tractor and a grader, and more particularly relates to an improved control mechanism therefor.

An object of the invention is to provide a tractor and grader combination so devised that a single operator, situated rearwardly of a tractor and forwardly of a grader drawn by said tractor, can observe the course of the tractor and the operations of the grader, and can conveniently manipulate all of the mechanisms necessary to the proper control and operation of both said tractor and said grader in the performance of their intended services.

A more specific object is to provide a tractor and grader combination including a side seat situated upon a rearward portion of the tractor, forwardly of a grader drawn thereby, so arranged that an operator at said seat can observe the course of the tractor and the operations of the grader, and also including manipulating extensions conveniently accessible to the operator for actuating the operating and control mechanisms of said tractor, and a remote control for the operative parts of the grader also conveniently accessible to the operator.

A further specific object is to provide a tractor and grader combination as stated, wherein the remote control for the operative parts of the grader includes flexibly mounted, telescopic manipulating shafts permitting variations in distance between the tractor and grader, as when making turns, or when traveling over rough ground, and wherein the portion of said remote control adjacent to the operator's seat, to be conveniently accessible to the operator is supported, desirably pivotally, upon the tractor to be maintained at approximately fixed distance from the operator and the tractor during any relative movements between the tractor and the grader in operation, to thus safeguard the operator and the tractor from injury or damage which has sometimes heretofore resulted, particularly during the making of square turns, by reason of interference between the grader adjusting mechanism and the operator or the tractor when the grader adjustment has been mounted upon the grader alone.

A further specific object is to provide a tractor and grader combination as stated, wherein the grader adjusting mechanism includes screw lifts for the grader blade operated by the flexibly mounted, telescopic manipulating shafts, which shafts are extended to the portion of the remote control for the grader mounted upon the tractor.

A further specific object is to provide a grader adjusting mechanism which includes a gear shifting device permitting actuation of either or both of the blade or screw lifts of the grader by manipulation of a single manipulating element or wheel, said gear shifting device desirably being a component part of the portion of the remote control for the grader mounted upon the tractor.

And a further specific object is to provide means, desirably a pivot pin, upon the hauling pole of the grader for receiving and carrying the portion of the remote control of the grader adapted to be mounted upon the tractor when the grader hauling pole and remote control are removed or separated from the tractor.

Additional objects of the invention will become apparent as the full description thereof proceeds, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 8 is an enlarged side elevational view of the forward portion of the grader, disclosing said grader as when removed from the tractor;

Fig. 9 is a detail sectional view of one of the duplicate screw lifts;

Fig. 10 is an enlarged sectional view, taken as on line 10—10 in Fig. 9;

Figure 1:
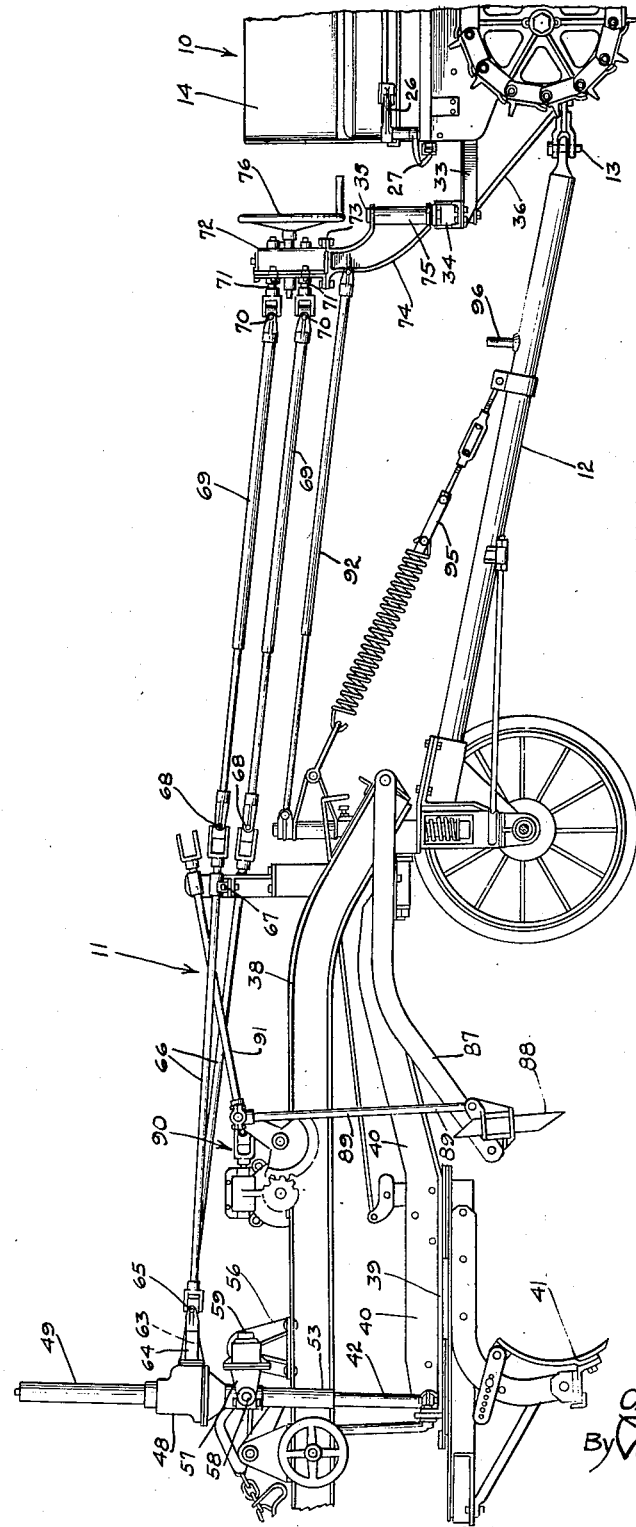
Fig. 1 is a side elevation view of portions of a tractor and a grader and controls therefor, having the features of the invention.
Figure 2:
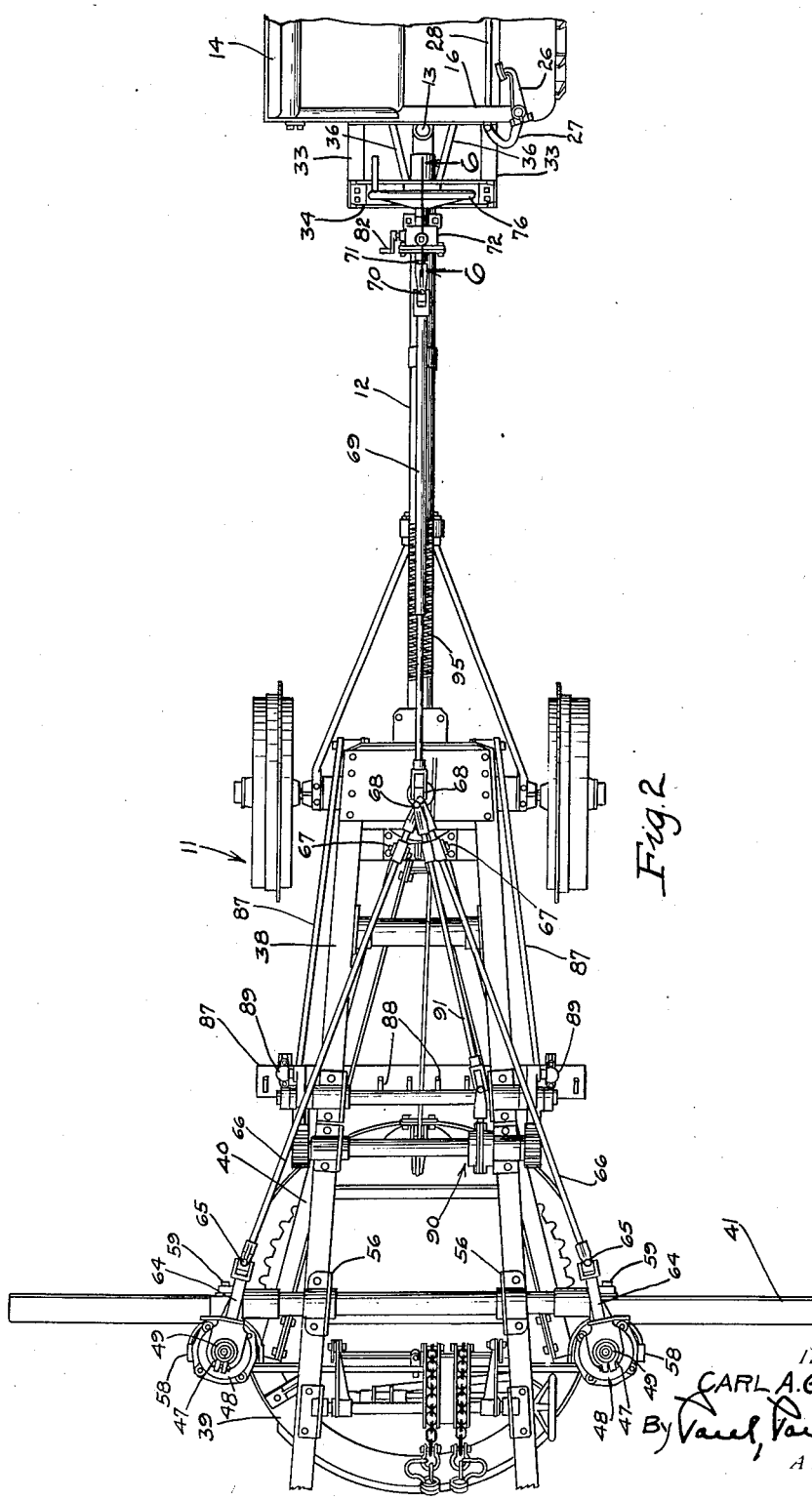
Fig. 2 is a plan view of the disclosure of Fig. 1.

With respect to the drawings and the numerals of reference thereon, 10 represents a tractor of ordinary or preferred construction, such as a track-type tractor, and 11 indicates a grader hitched to the tractor to be pulled thereby, as by a hauling pole 12 suitably mounted upon the front axle of the grader, and pivotally attached, as at 13, to a lower, rearward part of the tractor. See Fig. 1.

Figure 3:
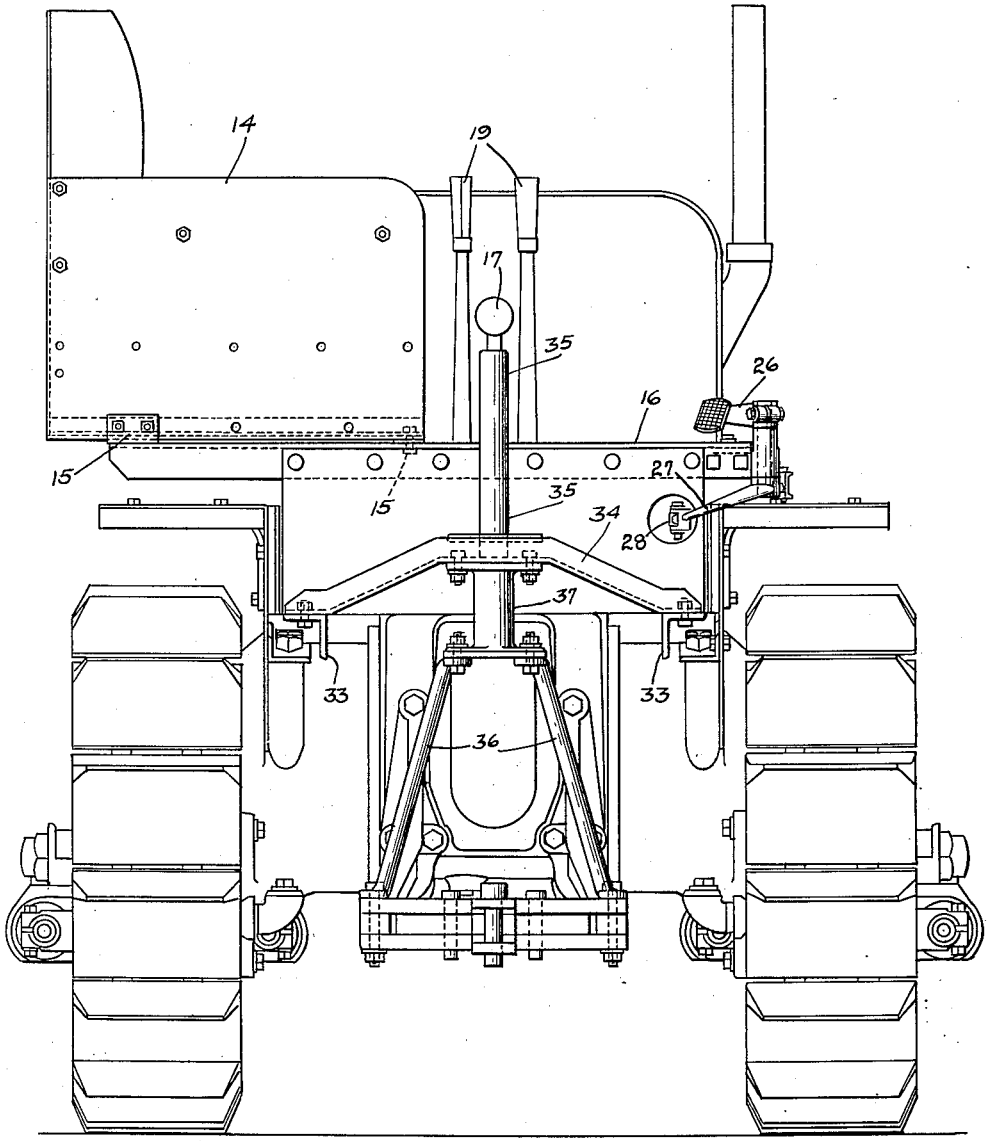
Fig. 3 is an enlarged rear elevational view of the tractor, as it appears when the grader is removed.
Figure 4:
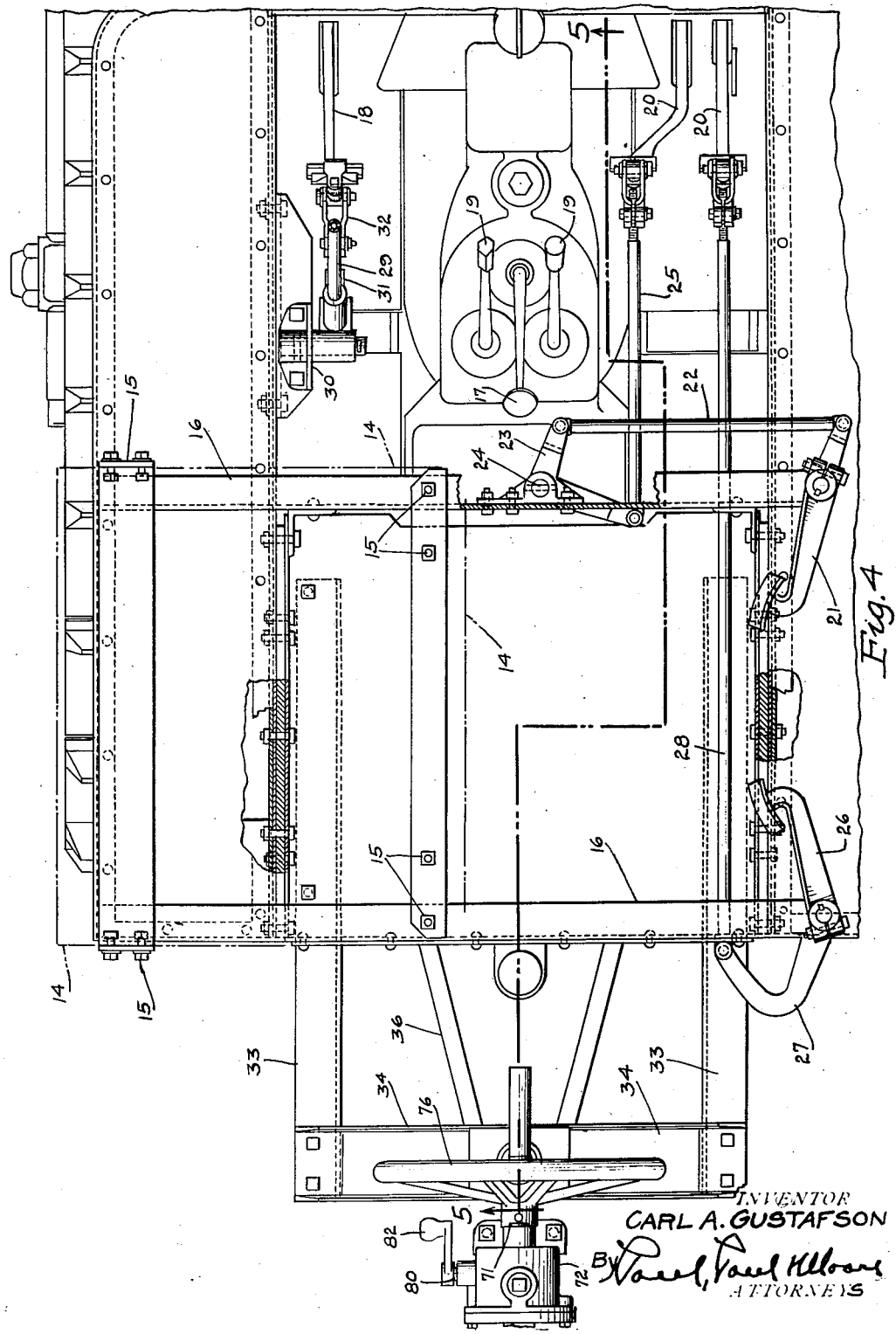
Fig. 4 is an enlarged plan view of the tractor, partially sectioned and partially broken away, detailing features of the tractor control.
Figure 5:
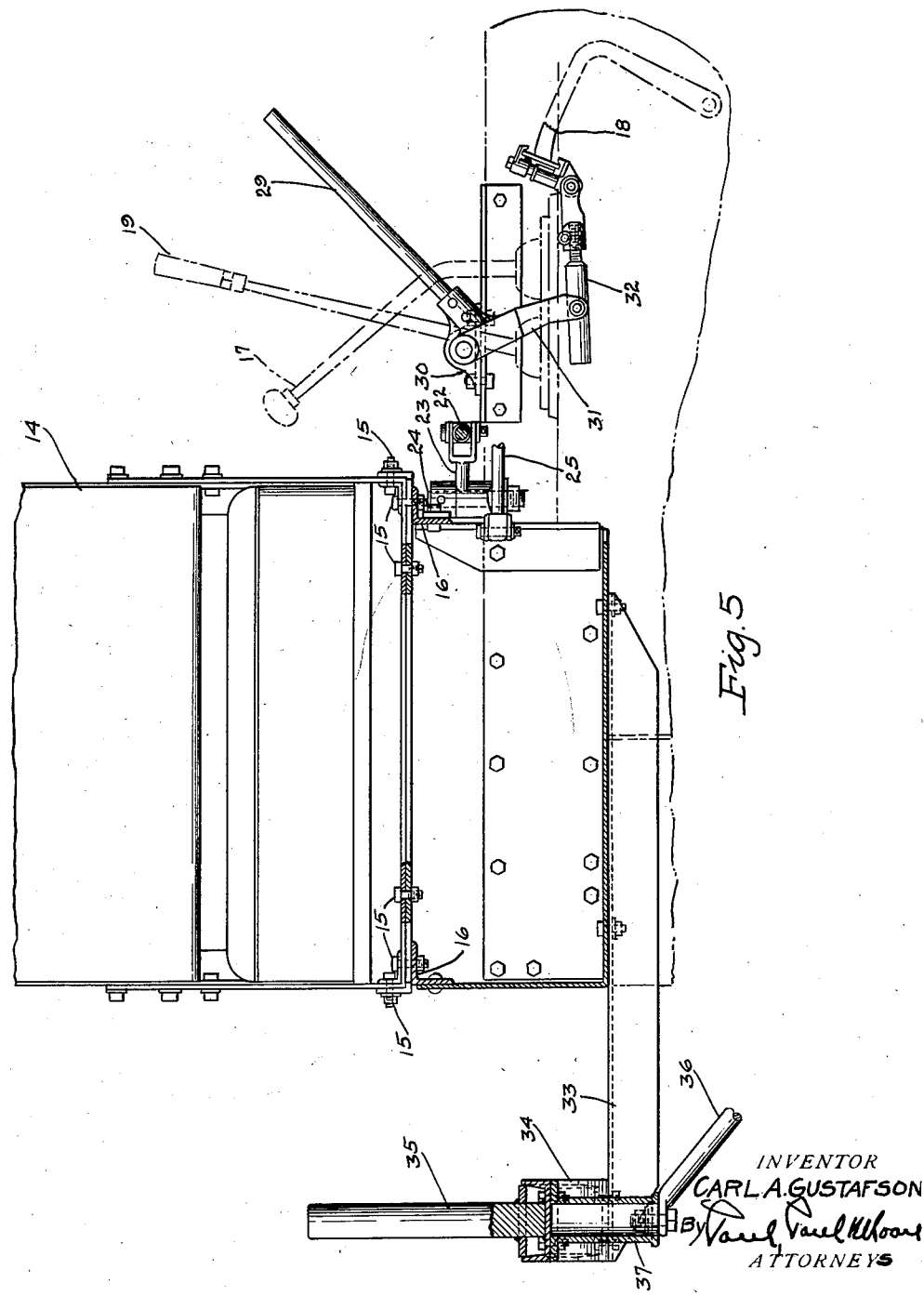
Fig. 5 is a vertical sectional view taken substantially on line 5—5 in Fig. 4.

The tractor includes a side seat 14 suitably secured upon a rearward portion thereof, as at 15, the back of said side seat desirably terminating about in alinement with a side of the tractor. See Figs. 3 and 4. In practice, the side seat arrangement for the tractor can consist of a platform 16 bolted into the place at the operator's station left vacant by removal of the seat of a tractor now of commerce, and the removed seat replaced upon the platform in sidewise position approximately as shown. As will be evident, an operator occupying the side seat 14 can readily observe the course of the tractor while also observing the operations of the grader.

The tractor may include the usual gear shifting lever 17, clutch pedal 18, steering clutch control devices 19, and brake pedals 20, all for the well known purposes of operating, guiding and controlling the tractor. As will be more clear from Fig. 4, the gear shifting lever 17 and the steering clutch control devices 19 are in convenient position to be accessible to an operator upon the seat 14. The platform 16 supports manipulating extensions, conveniently accessible to the operator, for actuating the brake pedals 20. As shown, means for actuating the left brake pedal 20 consists of a brake lever 21 arranged at a side of the tractor and suitably pivoted upon the platform directly in front of the left hand side of an operator when upon the operator's seat, a connecting link 22 pivoted between said brake lever 21 and a bell crank lever 23 pivoted upon the platform at 24, and a link 25 pivoted to the bell crank lever and arranged to engage said left brake pedal 20. Means for actuating the right brake pedal 20 consists of a brake lever 26 arranged at a side of the tractor and suitably pivoted upon the platform directly in front of the right hand side of an operator when seated upon the operator's seat, a crooked lever 27 fixed to rotate with the brake lever 26, and a link 28 pivoted to the lever 27 and arranged to engage said right brake pedal 20. The clutch pedal 18 is adapted to be actuated by a hand lever 29 situated slightly forwardly of the seat 14 to be conveniently accessible to the operator. As shown, the hand lever 29 is pivotally supported upon a bracket 30 arranged upon the tractor. An extension 31 of the hand lever pivotally carries a link device 32, of any convenient construction, which extends between the hand lever extension 31 and the clutch pedal 18.

It will be apparent that the arrangement as just described provides for convenient manipulation by an operator at the seat 14 of all of the mechanisms necessary to the proper control and operation of the tractor.

A rear extension of the tractor, or of the platform 16, consists of spaced apart longitudinal bars 33 supporting a cross-bar 34 arranged in spaced relation to the tractor. As shown more clearly in Fig. 3, the cross-bar 34 extends upwardly and inwardly from the longitudinal bars 33. The central portion of the cross-bar supports an upstanding pivot pin 35, and is braced from the tractor in any suitable manner, as by oblique rods 36 which carry a hollow bracket 37 attached to the lower face of the center part of said cross-bar 34. The upstanding pivot pin 35 is desirably situated midway between the tractor wheels, and may be secured to the cross-bar 34 in any convenient manner.

The grader includes, in addition to the hauling pole 12, a wheel supported frame 38 the front portion of which is rotatably supported upon the forward axle of the grader, and the rear portion of which may desirably be supported in fixed relation to the rearward axle. A blade supporting frame 39 is mounted beneath the main frame of the grader, and is connected by a pair of diverging draft beams 40 with a forward portion of the grader by means of a suitable ball-and-socket joint. The usual blade or ground engaging tool 41 of the grader is adjustably secured to the blade supporting frame 39 in any convenient manner. Also, suitable means of ordinary or preferred construction is provided for moving the blade supporting frame 39 transversely of the grader. Lifting rods 42 are universally attached to opposite side portions of the blade supporting frame 39, and each lifting rod has its upper portion 43 threaded, as shown in Fig. 9, to receive a threaded member 44 having a gear 45 suitably secured thereto. Each threaded member 44 is mounted within a suitable gear casing including a guide sleeve 46 through which the upper end of the lifting rod passes. The lifting mechanisms at the opposite side portions of the grader are of like construction. Each guide sleeve 46 is secured in position by means of a clamping bolt 47 provided in a split hub 48 of the casing member. A tubular member 49 is secured to the upper end of the guide sleeve 46 and extends upwardly therefrom to provide a guard or closure for the threaded portion of the lifting rod. The upper end of the tubular member 49 has a cap or closure 50 provided with a suitable aperture 51 for the introduction of lubricant into the tubular member. The lower portion of the gear casing is provided with a guide 52 traversed by the lifting rod. This guide has a tubular member 53 secured to its lower end and encasing a lower portion of the lifting rod to prevent dust, etc., from coming in direct contact with the threaded portion of the rod. The guide 52 is provided with oppositely extending hubs 54 which receive bushings 55. A bracket 56 is secured to the frame of the grader and projects outwardly therefrom. A yoke 57 is pivotally mounted in the bracket, and the spaced legs of this yoke are provided with trunnions 58 engaging the bushings 55. The alined axes of the trunnions 58 and the axis of the pivot 59, which connects the yoke 57 to the bracket 56, are desirably located in the same plane, and provide a universal joint between the gear casing and the main frame. The threaded members 44 are interposed between suitable anti-friction thrust bearings 60, as shown in Fig. 9, and the guide sleeve 46 is preferably adjustably mounted in the gear housing for the purpose of taking up play in the thrust bearings. A pinion 62 is mounted within the gear casing and meshes with the gear 45. The pinion 62 has a short shaft 63 rotatably mounted in a bearing 64 provided in the gear casing. A universal joint 65 connects the short shaft 63 with a longer shaft 66. The forward portion of each shaft 66 is flexibly mounted upon the grader frame, as at 67, and the forward end of each shaft 66 is universally connected, as at 68, to a telescopic shaft 69. The forward end of each telescopic shaft 69 includes a universal joint 70 connecting it to a short shaft 71, said short shafts 71 being rotatably mounted in a gear casing 72 suitably secured, as at 73, to a supporting bracket 74 having a tubular part 75 adapted to be arranged upon the pivot pin 35.

The gear casing 72 includes a gear shifting device for permitting rotation of either or both of the telescopic shafts 69 by turning movement of a hand wheel 76 fixed to a short shaft 77 rotatably and slidably mounted in said gear casing 72 between the short shafts 71, to actuate either or both of the screw lifts of the grader.

Figure 6:
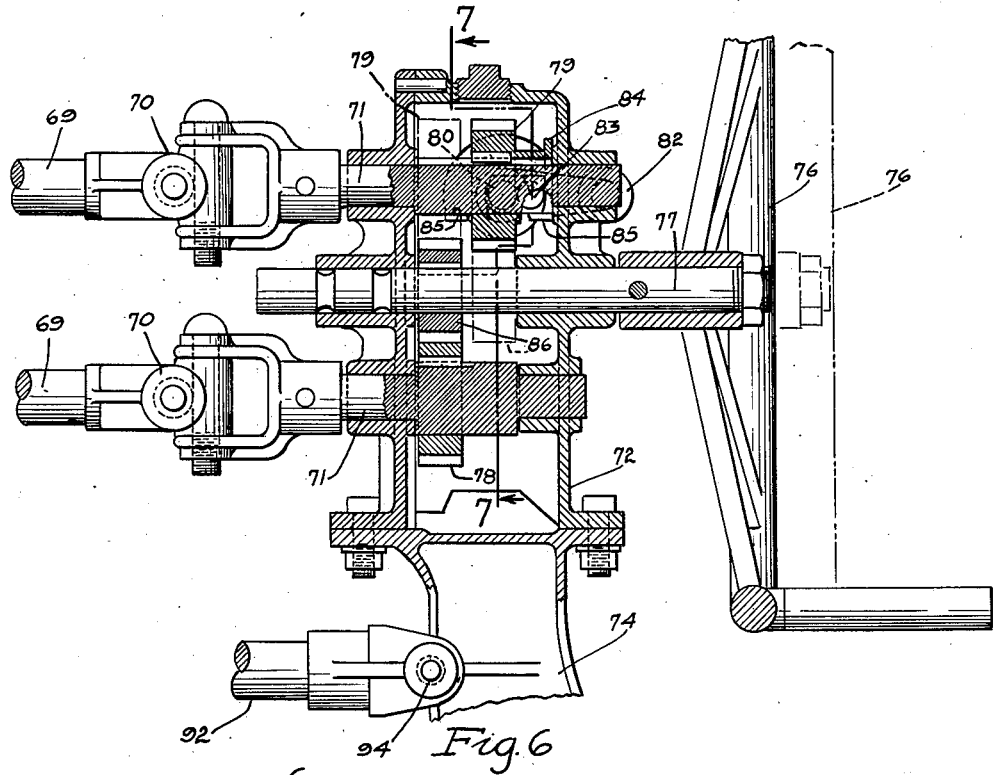
Fig. 6 is an enlarged sectional view taken substantially on line 6—6 in Fig. 2 and Fig. 7, detailing features of the gear shifting device of the grader control.
Figure 7:
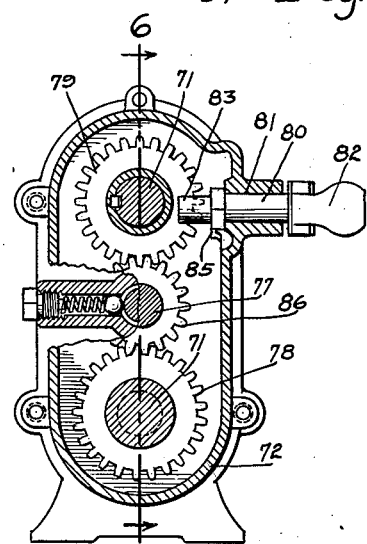
Fig. 7 is a sectional view, taken as on line 7—7 in Fig. 6.

As disclosed, one of the short shafts 71, the lower one in Figs. 6 and 7, carries a gear 78 arranged within the gear casing 72 rearwardly thereof. The gear 78 is keyed to its shaft and is fixed against longitudinal movement. The other short shaft 71, the upper one in Figs. 6 and 7, carries a gear 79 which is slidably keyed to its shaft to be movable rearwardly in the gear casing to align with the gear 78, or forwardly in said gear casing out of alignment with said gear 78. Means for sliding the gear 79 along its shaft consists of a short crank shaft 80 rotatably mounted in the gear casing, as at 81, a crank handle 82 upon the outer end of the crank shaft, and a crank upon the inner end of said crank shaft having a lug 83 arranged between said gear 79 and a collar 84 integral therewith. The crank is rotatable through an arc of 180°, and rotative movement of said crank in both directions is limited by suitable stops 85 in the gear casing. The short shaft 77 fixedly carries a gear 86 adapted to mesh with either or both of the gears 78 and 79. To rotate the upper short shaft 71 alone, the hand wheel 76 is moved away from the gear casing 72 to cause the gear 86 to mesh with the gear 79 while in its position out of alignment with the gear 78, as said gear 79 is shown in full lines in Fig. 6. To rotate the lower short shaft 71 alone, the hand wheel 76 is moved toward the gear casing 72 to cause the gear 86 to mesh with the gear 78 while the gear 79 is in its position out of alignment with said gear 78. To rotate both short shafts 71 simultaneously, the gear 79 is moved to position to align with the gear 78, and the hand wheel 76 is moved toward the gear casing 72 to cause the gear 86 to mesh with both of said gears 78 and 79. As will be apparent, rotation of the gear 86 will cause the gears 78 and 79 to revolve in the same direction, so that both side portions of the blade supporting frame 39 can be simultaneously raised and simultaneously lowered.

As hereinbefore stated, the pivot pin 35, which pivotally carries the tubular part 75 of the supporting bracket 74, is mounted at the rear of the tractor in spaced relation to the operator's seat and the tractor, desirably at the midwidth of the tractor. Said pivot pin 35 thus provides a support for a portion of the remote control for the grader adjacent to the operator's seat, to be conveniently accessible to the operator, and maintains said portion of the remote control, that is to say, the hand wheel 76 and its associated parts, at approximately fixed distance from the operator and the tractor during relative movements between the tractor and the grader, as when making turns, or when traveling over rough ground, to thus safeguard the operator and the tractor from injury or damage which might result by interference between the grader adjusting mechanism and the operator and the tractor were the grader adjustment mounted solely upon the grader. The flexibly mounted, telescopic manipulating shafts 69, which are extended to the portion of the remote control mounted upon the tractor, or, in other words, to the supporting bracket 74, permit variations in distance between the tractor and grader in operation. In practice, square turning over rough ground is readily permitted without possibility of interference between the tractor and the grader.

As already mentioned, each side portion of the blade supporting frame 39 is provided with a screw lifting mechanism operated as set forth. The universal connections between said lifting mechanisms and the grader frame and the blade supporting frame, respectively, permit adjustment of the blade to any preferred angular position relatively to the ground and the grader frame. That is to say, one end portion of the blade may be adjusted to a higher elevation than the other end portion thereof without affecting the operation of the lifting mechanisms.

A scarifier frame 87 is shown pivotally connected to a forward portion of the grader frame. Said scarifier frame carries a scarifier 88, and is adapted for vertical adjustment by means of connecting rods 89 having their lower ends pivotally connected to the scarifier frame and their upper ends universally connected to any ordinary or preferred type of raising and lowering mechanism, designated generally at 90, including a manipulating shaft 91 which may be connected or extended, as by a telescopic shaft (not shown), to the gear casing of the supporting bracket 74, and there provided with means (not shown) such as a hand wheel, for actuating said shaft 91. In practice, the scarifier frame is usually operated when the blade 41 is out of use, one of the telescopic shafts 69 being disconnected and attached to the shaft 91.

A telescopic alignment bar 92, just below the telescopic adjustment shafts 69 and pivoted at its rearward end 93 upon the grader frame and at its forward end 94 upon the supporting bracket 74, is for the purpose of keeping the telescopic shafts 69 in alignment with the direction of movement of the tractor and the grader.

The gear casing 72, the universal joints 70 between the telescopic shafts 69 and the short shafts 71, and the alignment bar 92, are located substantially above the pivot pin 35, so that no interference is offered between said mentioned parts and the pivot pin support when making turns or when traveling over rough ground.

A resilient brace 95 suitably supports the hauling pole 12 from the grader frame in such manner as to allow for slight upward and downward swinging movement of said hauling pole in use. A forward portion of the hauling pole has an upstanding pin 96 for receiving the tubular part 75 of the supporting bracket 74, to thus carry said bracket, and conveniently support it and its associated parts, when a grader having said hauling pole and supporting bracket is removed or separated from a tractor. See Fig. 8.

Figure 11:
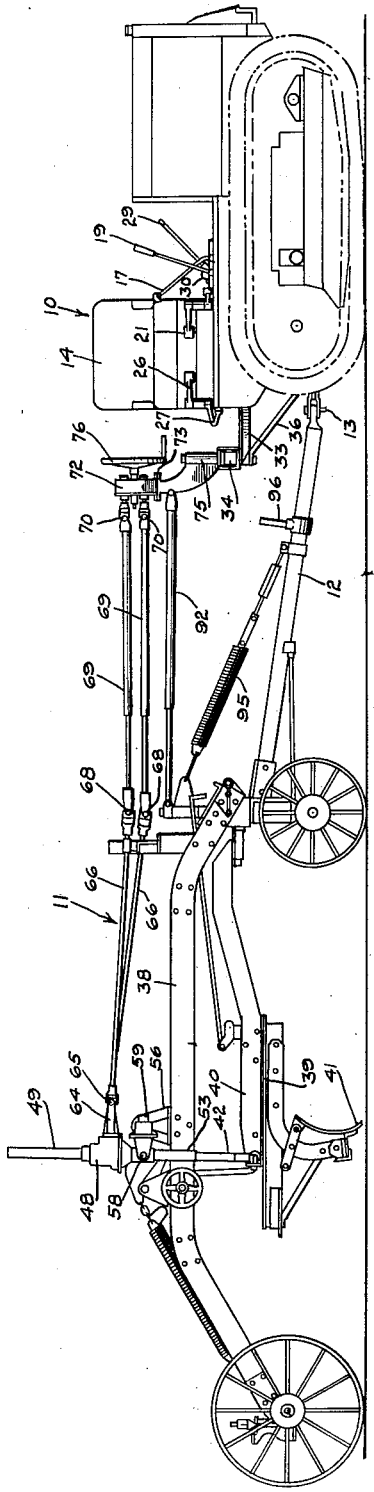
Fig. 11 is a side elevation of a tractor and a grader, showing a complete train with the invention embodied therein.

Fig. 11 illustrates diagrammatically a complete train including a tractor and a conventional type of small grader. The controls of the grader are shown extended forwardly for convenient manipulation by an operator on the tractor seat 10.

Figure 12:
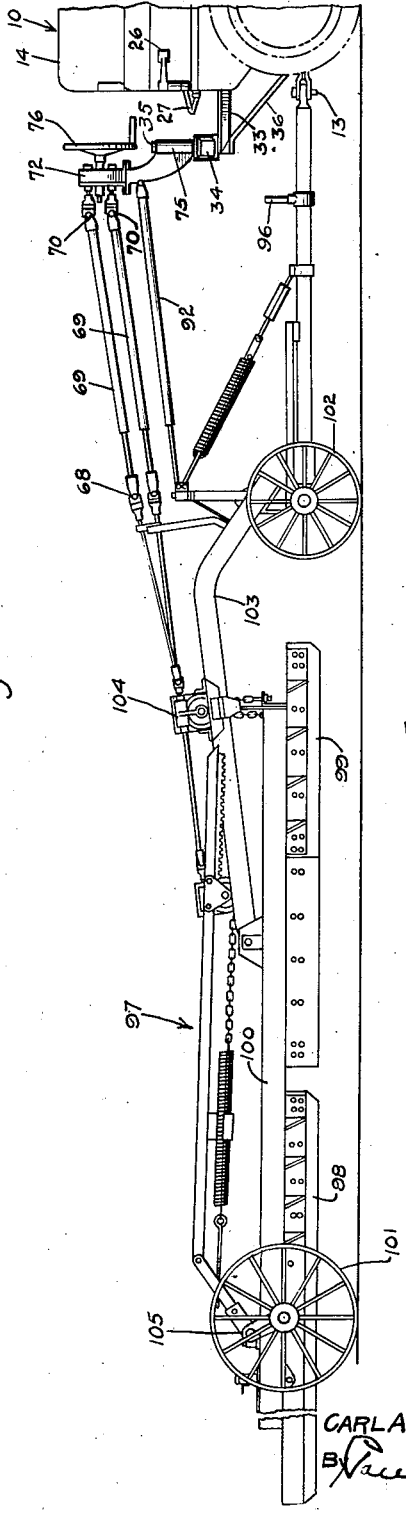
Fig. 12 is a similar view showing a road planer or drag connected with a tractor.

Fig. 12 illustrates a train wherein the tractor is connected to a road planer or drag 97, comprising a plurality of ground working blades 98—99 shown supported upon a suitable frame 100 desirably mounted upon wheels 101 and 102. The forward portion of the main frame 100 is adjustably supported upon the front wheels 102 by means of an auxiliary frame 103 and suitable adjusting mechanism, indicated at 104. The rear portion of the main frame 100 is also adjustable vertically by means of suitable mechanism indicated at 105.

I claim as my invention:

1. In combination, a tractor, a grader at the rear of said tractor and adapted to be drawn thereby, a side seat situated upon a rearward portion of the tractor forwardly of the grader whence an operator can observe the course of the tractor and the operations of the grader, manipulating devices for actuating the operating and control mechanisms of the tractor conveniently accessible to an operator at said side seat, and a remote control for the operative parts of the grader comprising a supporting bracket having a pivotal connection with the rear of the tractor body, whereby said remote control is accessible to an operator at said side seat.

2. In combination, a tractor, a grader at the rear of said tractor, a hauling pole for attaching said grader to said tractor to be drawn thereby, a grader blade, spaced apart lifting devices for said grader blade, telescopic shafts for actuating said lifting devices, an operator's station situated upon a rearward portion of the tractor forwardly of the grader whence an operator can observe the course of the tractor and the operations of the grader, manipulating devices for actuating the operating and control mechanisms of said tractor convenient to said operator's station, means for manipulating said telescopic shafts and a supporting bracket for said means pivotally mounted upon a rear portion of said tractor, whereby said manipulating means will be maintained in approximately fixed relation to said operator's station.

3. In combination, a tractor, a grader at the rear of said tractor, a hauling pole for attaching said grader to said tractor to be drawn thereby, a grader blade, spaced apart lifting devices for said grader blade, a telescopic shaft for actuating each lifting device, a side seat situated upon a rearward portion of the tractor forwardly of the grader whence an operator can observe the course of the tractor and the operations of the grader, manipulating devices for actuating the operating and control mechanisms of said tractor conveniently accessible to an operator at said side seat, means for manipulating said telescopic shafts and a support for said means pivotally mounted upon a rear portion of said tractor, whereby said manipulating means will be maintained in approximately fixed relation to said side seat.

4. In combination, a tractor, a grader at the rear of said tractor, a hauling pole for attaching said grader to said tractor to be drawn thereby, means including telescopic shafts for manipulating the operative parts of said grader, a bracket supporting said telescopic shafts, means upon the tractor for supporting said bracket when said hauling pole is attached to said tractor, and means upon said hauling pole for supporting said bracket when said grader is disconnected from said tractor.

5. In a train comprising a tractor and a vehicle, a plurality of adjustable mechanisms on said vehicle, and a control unit on said tractor for selectively operating said mechanisms, said control unit being pivotally mounted upon a rearward extension of the tractor.

6. In a train comprising a tractor and a vehicle, a plurality of adjustable mechanisms in said vehicle, a selective gear transmission operatively connected with said mechanisms and having a single operating member, and means for pivotally supporting said gear transmission on a rearward portion of the tractor.

7. In combination, a tractor and an implement, mechanism on said implement, operating means therefor, and means for optionally supporting said operating means on said tractor or said implement.

8. In combination, a tractor and an implement, mechanism on said implement, and operating means therefor, a support for said operating means on said tractor, a second support for said operating means on said implement, and means for maintaining an operative connection between said operating means and said mechanism when said operating means is transferred from one support to the other.

9. In combination, a tractor and an implement, mechanism on said implement, and operating means therefor, separate supports on the tractor and implement for said operating means and a flexible connection between said operating means and said mechanism permitting said operating means to be freely moved from one support to the other.

10. In combination, a tractor and an implement, a connection therebetween having a pivotal action about a vertical axis on the tractor, a mechanism for operating said implement, and a support for said mechanism having pivotal action about a vertical axis other than said first named axis.

11. In combination, a traction vehicle, a second vehicle at the rear of said traction vehicle and adapted to be drawn thereby, an operator's station situated upon a rearward portion of said traction vehicle forwardly of the second vehicle whence an operator can observe the course of the traction vehicle and the operations of the second vehicle, manipulating devices for actuating the operating and control mechanisms of said traction vehicle convenient to said operator's station, a rearward extension on said traction vehicle, a pivot pin on said rearward extension, a remote control for the operative parts of the second vehicle comprising a gear casing, and a supporting bracket for said gear casing having a tubular part adapted to be seated on said pivot pin whereby said remote control is maintained in approximately fixed relation to said operator's station.

12. In a train comprising a tractor and an implement, adjustable mechanism on said implement, a control unit for operating said mechanism, a rearward extension on said tractor having a pivot pin thereon, and a supporting bracket for said control unit having a tubular part adapted to be seated on said pivot pin.

13. In a train comprising a tractor and a vehicle, adjustable mechanism on said vehicle, a control unit for operating said mechanism, a rearward extension on said tractor having a pivot pin thereon, a supporting bracket for said control unit having a tubular part adapted to be seated on said pivot pin, telescopic drive means universally connected to said control unit and said adjustable mechanism, and an extensible aligning connection between said vehicle and said supporting bracket for maintaining said control unit substantially in alignment with the direction of movement of said tractor and said vehicle.

14. In a vehicle train, a draft vehicle having an operator's station thereon, a second vehicle adapted to be moved by said draft vehicle and having adjustable mechanism thereon, a draft connection between said vehicles enabling relative movement between said vehicles upon propulsion or turning of said train, and means for adjusting said mechanism from adjacent the operator's station of said draft vehicle; said means including a control box unit adjacent said station, said control unit being mounted for bodily movement in an arcuate path and as a unit relative to both said draft vehicle and said second vehicle in response to relative movement between said vehicles.

15. In a vehicle train, a draft vehicle having an operator's station thereon, a second vehicle adapted to be moved by said draft vehicle and having adjustable mechanism thereon, a draft connection between said vehicles enabling relative movement between said vehicles upon propulsion or turning of said train, and means for adjusting said mechanism from adjacent the operator's station of said draft vehicle; said means including a control box unit adjacent said station and adjacent the rear of said draft vehicle, and extensible telescopic shafting connected between said mechanism and said control unit; said control unit being mounted for bodily movement in an arcuate path as a unit relative to both said draft vehicle and said second vehicle in response to relative movement between said vehicles.

16. In a vehicle train, a draft vehicle having an operator's station thereon, a second vehicle adapted to be moved by said draft vehicle and having adjustable mechanism thereon, a draft connection between said vehicles enabling relative movement between said vehicles upon propulsion or turning of said train, a seat at said operator's station facing a side of said draft vehicle so that the operator in said seat can observe the course of said draft vehicle and the adjustment of said mechanism, controls for said draft vehicle adjacent said station and adjacent said seat, and means for adjusting said mechanism from adjacent the operator's station of said draft vehicle; said means including a control box unit adjacent said station and adjacent said seat, said control unit being mounted for bodily movement in an arcuate path and as a unit relative to both said draft vehicle and said second vehicle in response to relative movement between said vehicles.

17. In a vehicle train, a draft vehicle having an operator's station adjacent the rear end thereof, a drawn vehicle having adjustable mechanism thereon, a draft connection between said vehicles including a draft pole connected to said draft vehicle adjacent the rear end thereof for movement about an upright axis to allow relative movement between said vehicles caused by movement of said train, means for adjusting said adjustable mechanism from adjacent said station including a control box unit, and means for mounting said unit for bodily movement as a unit relative to both said draft vehicle and said second vehicle and about an upright axis in response to relative movement between said vehicles.

CARL A. GUSTAFSON.